(12) United States Patent
Cerepi et al.

(10) Patent No.: US 10,816,494 B2
(45) Date of Patent: Oct. 27, 2020

(54) DEVICE FOR DETERMINING PETROPHYSICAL PARAMETERS OF AN UNDERGROUND FORMATION

(71) Applicant: IFP Energies nouvelles, Rueil-Malmaison (FR)

(72) Inventors: Adrian Cerepi, Pessac (FR); Herve Deschamps, Noisy le Roi (FR); Bruno Garcia, Rueil Malmaison (FR)

(73) Assignee: IFP ENERGIES NOUVELLES, Rueil-Malmaison (FR)

( * ) Notice: Subject to any disclaimer, the term of this patent is extended or adjusted under 35 U.S.C. 154(b) by 163 days.

(21) Appl. No.: 16/089,909

(22) PCT Filed: Mar. 10, 2017

(86) PCT No.: PCT/EP2017/055695
§ 371 (c)(1),
(2) Date: Sep. 28, 2018

(87) PCT Pub. No.: WO2017/167567
PCT Pub. Date: Oct. 5, 2017

(65) Prior Publication Data
US 2019/0086350 A1    Mar. 21, 2019

(30) Foreign Application Priority Data

Apr. 1, 2016   (FR) ..................................... 16 52871

(51) Int. Cl.
*G01N 27/02*    (2006.01)
*G01V 3/26*    (2006.01)
*G01V 3/24*    (2006.01)

(52) U.S. Cl.
CPC ............. *G01N 27/026* (2013.01); *G01V 3/24* (2013.01); *G01V 3/26* (2013.01)

(58) Field of Classification Search
CPC ........ E21B 47/09; E21B 47/125; G01R 31/50
See application file for complete search history.

(56) References Cited

U.S. PATENT DOCUMENTS 2,713,146 A    7/1955  Doll
4,658,215 A    4/1987  Vinegar et al.
(Continued)

FOREIGN PATENT DOCUMENTS

EP        0426563 A2    5/1991

OTHER PUBLICATIONS

International Search Report for PCT/EP2017/055695, dated May 12, 2017; English translation submitted herewith (9 pgs.).
(Continued)

*Primary Examiner* — Alvaro E Fortich
(74) *Attorney, Agent, or Firm* — Fitch, Even, Tabin & Flannery LLP (57) ABSTRACT

The invention relates to a device for determining petrophysical parameters of an underground formation, comprising at least two electrodes (EL), a means for emitting a frequency-variable electric current (MEC), and a means for measuring electrical resistivity (MRE) in terms of amplitude and phase, two of the electrodes (EL) cooperating with the emission means (MEC) and at least two of the electrodes (EL) cooperating with the means for measuring resistivity (MRE), a means for measuring a difference in electrical potential (MDP) cooperating with at least two of the electrodes (EL). The invention is particularly applicable to oil exploration and development.

21 Claims, 4 Drawing Sheets

(56) References Cited

U.S. PATENT DOCUMENTS

| | | | |
|---|---|---|---|
| 4,730,162 A | 3/1988 | Vinegar et al. | |
| 5,008,625 A | 4/1991 | Chen | |
| 7,388,381 B1 | 6/2008 | Werkema, Jr. | |
| 2005/0264295 A1* | 12/2005 | Strack | G01V 3/24 324/375 |
| 2006/0170424 A1* | 8/2006 | Kasevich | E21B 43/24 324/338 |
| 2007/0279063 A1* | 12/2007 | Beard | G01V 3/24 324/355 |
| 2009/0256575 A1* | 10/2009 | Pisklak | G01V 3/22 324/355 |
| 2010/0026305 A1* | 2/2010 | Yanzig | G01V 3/20 324/355 |
| 2013/0066556 A1* | 3/2013 | Bucker | G01V 3/24 702/2 |
| 2015/0167439 A1* | 6/2015 | Kasevich | E21B 43/168 166/248 |

OTHER PUBLICATIONS

Huang Zhen et al: "A Novel Design of Master Control Syetem for Induced Polarization Logging Instrument ", Electrical and Control Engineering (I CECE), 2010 International Conference on, IEEE, Piscataway, NJ, USA, Jun. 25, 2010 (Jun. 25, 2010), pp. 183-186, XP031796359.

A. Revil et al: "Review: Somelow-frequency electrical methods for subsurface characterization and monitoring in hiydrogeology" , Hydrogeology Journal,vol. 20, No. 4,Feb. 10, 2012 (Feb. 10, 2012), pp. 617-658, XP055203095.

"Hamidreza Ramazi et al: Application of integrated geoelectrical methods in Marand (Iran) manganese deposit exploration" , Arabian Journal of Geosciences, vol. 6, No. 8, Feb. 28, 2012 (Feb. 28, 2012), pp. 2961-2970, XP055325856.

Lech Rusiniak: "Spontaneous polarization of water in porous structure of a solid body", Geophysical Journal International, Feb. 1, 2002 (Feb. 1, 2002), pp. 313-319, XP055325798.

Johnmary Kiberu: "Induced polarization and Resistivity measurements on a suite of near surface soil samples and their empirical relationship to selected measured engineering parameters", Mar. 1, 2002 (Mar. 1, 2002), XP055325843.

V S Sarma: "Electrical Resistivity(ER), Self Potential (SP), Induced Polarisation (IP), Spectral Induced Polarisation (SIP) and Electrical Resistivity Tomography (ERT) prospection in NGRI for the past 50 years—A Brief Review", J. Ind. Geophys. Union, vol. 18, No. 2, Apr. 1, 2014 (Apr. 1, 2014), pp. 245-272, XP055325790.

\* cited by examiner

DEVICE FOR DETERMINING PETROPHYSICAL PARAMETERS OF AN UNDERGROUND FORMATION

CROSS REFERENCE TO RELATED APPLICATIONS

Reference is made to PCT/EP2017/055695 filed Mar. 10, 2017, and French application Ser. No. 16/52,871 filed Apr. 1, 2016, which are incorporated herein by reference in their entirety.

BACKGROUND OF THE INVENTION

Field of the Invention

The present invention relates to exploration and exploitation of a fluid contained in an underground formation and more particularly to the exploration and exploitation of oil reservoirs, or of geological sites for storage of gas, such as carbon dioxide (denoted $CO_2$ hereinafter) or methane.

Description of the Prior Art

The exploration and exploitation of oil deposits requires acquiring an accurate as possible knowledge of the underground geology, and, in order to effectively provide an evaluation of the reserves, modelling of the production or management of the exploitation. For example, the determination of the location of a production well or of an injection well within a deposit of hydrocarbons, the composition of the drilling mud, the completion characteristics, the choice of a process for recovering the hydrocarbons (such as injection of water for example) and parameters necessary for the implementation of this process (such as the injection pressure, the production rate, etc.) call for good knowledge of the deposit which is understood to mean as precise as possible description of the structure of the deposit being studied, of its petrophysical properties, or the properties of the fluids present in the deposit being studied.

In order to acquire this knowledge, the oil industry combines the measurements carried out in situ (during seismic surveys, measurements in wells, core drillings, etc.), the measurements carried out in a laboratory (study of thin sections, permeability measurements etc), and also numerical simulations (performed using software, that reproduces as accurately as possible at least one of the physical and chemical phenomena occurring in situ or on the laboratory scale). This knowledge is generally formalized in a mesh, known under the term "geological model". Each grid cell comprises one or more petrophysical parameters (such as porosity, permeability, lithology). In order to reproduce or predict (that is to "simulate") the actual production of hydrocarbons, a reservoir engineer implements calculation software, referred to as a "reservoir simulator". The reservoir simulator is a flow simulator which calculates the flows and the change in pressures within the reservoir represented by a "reservoir model". The results of these calculations make possible in predication and optimized exploitation schemes (definition of the number of wells to be drilled, of the position thereof, of the enhanced recovery mode, etc.) of the deposit being studied in order to improve at least one of the flow rates and the amounts of hydrocarbons being recovered.

Thus, the exploitation of the fluid present in an underground formation requires in particular a good knowledge of the underground formation in which the fluid of interest is trapped.

The following documents will be cited in the remainder of the description:

Binley, A., Later D. L., Fukes, M., Cassiani, G. l., 2005. Relationship between Spectral Induced Polarization and Hydraulic Properties of Saturated and Unsaturated Sandstone, Water Resources Research, vol. 41, W12417, 2005.

Chilingar, G. V., Haroun, M., 2014. Electrokinetics for Petroleum and Environmental Engineers, book, ed. Wiley, ISBN: 978-1-118-84269-0, 264 pages, January 2015.

Cuevas, N., Rector, J. W., Moore, J. R., Glaser, S. D., 2009. Electrokinetic Coupling in Hydraulic Fracture Propagation, SEG International Exposition and Annual Meeting, 2009, p 1721-1725.

Daily, W., Ramirez, A., Binley, A., 2004, Remote Monitoring of Leaks in Storage Tanks using Electrical Resistance Tomography: Application at the Hanford Site, Journal of Environmental and Engineering Geophysics, March-April 2004, Vol. 9, No. 1: pp. 11-24.

Olhoeft, G. R. (1985), Low-frequency Electrical Properties; Geophysics, v. 50, no. 12, pp. 2492-2503.

Onizawa, S., Matsushima, N., Ishido, T., Hase, H., Takakura, S., Nish., Y., 2009. Self-potential Distribution on Active Volcano Controlled by Three-dimensional Resistivity Structure in Izu-Oshima, Japan, Geophys. J. Int. (2009) 178, 1164-1181.

Saunders, J., Jackson, M., and Pain, C., 2008. Fluid flow Monitoring in Oil Fields Using Downhole Measurements of Electrokinetic Potential, Geophysics, vol. 73, no. 5 September-October 2008, 10.1190/1.2959139.

Scott, J. B. D. and Barker, R. D., 2003. Determining Pore-throat Size in Permo-Triassic Sandstones from Low-Frequency Electrical Spectroscopy, Geophysical Research Letters, Volume 30, Issue 9, May 2003.

The electrical measurements of materials from an underground formation are generally well known in the field of geosciences. These measurements include the Spontaneous Potential measurements and the Induced Spectral Polarization measurements.

The Spontaneous Potential (denoted SP hereinafter) measurements are used for the purpose of improving vision of the structure of the objects that are found near the surface (from several hundreds of meters to several thousands of meters deep) or else the knowledge of the volumes of fluids present within an underground formation and the circulation of these fluids. For example, in the field of volcanology, the SP measurement is used for the purpose of highlighting the presence of an upwelling of electrically charged hot fluids, inducing an electrical signal by electrofiltration, and producing a negative SP anomaly.

In the oil field, the use of SP measurements is known within the context of the storage of gas (natural gas and/or $CO_2$), or of the production of conventional and nonconventional hydrocarbons, by primary production (determination of the water/oil/gas saturation), secondary production (impact of the injection of seawater for example) or else tertiary production (enhanced oil recovery (EOR), by injection of chemicals such as polymers/surfactants). For example, in the field of oil production, from the document (Saunders et al., 2008) it is known to model the behavior of the SP signal in a borehole during pumping of hydrocarbons in an oil reservoir. These authors highlight in particular the relevance of SP measurements for monitoring the propagation of the water/hydrocarbon interface with water injected during the pumping. Still in the field of hydrocarbon production, the use of electrokinetic current injection techniques to improve the enhanced recovery process in reservoirs by injection of $CO_2$ is known from the document (Chilingar and Haroun, 2014).

The use of the electrokinetic coupling coefficient in geomechanics is also known from the document (Cuevas et al., 2009), in particular for monitoring hydraulic fracturing processes. Indeed, in the oil field, the technique of fracturing the reservoir rock under the effect of the high hydraulic pressure exerted on the rock is widely used to improve the properties of a reservoir (in particular its permeability, thus making it possible to improve the recovery of the oil in the reservoir. This hydraulic fracturing is accompanied by gradual openings of fractures and gives rise to an increase in the density of the electrokinetic field and of the spontaneous potential. Thus, the measurement and monitoring of this spontaneous potential SP enables "real-time monitoring" of the opening of these fractures and makes it possible to quantify the improvement in the permeability of the reservoir.

It can also be noted that there are, in the oil field, devices for well-scale Spontaneous Potential measurements (referred to as logging measurements). For example, from the patents U.S. Pat. No. 2,713,146 and EP 0426563 (corresponding to U.S. Pat. No. 5,008,625) it is known that it is possible to perform Spontaneous Potential measurements in a well passing through a geological formation. Such devices are in particular used to evaluate the amount of clay in the sedimentary formations.

Spectral Induced Polarization (denoted SIP hereinafter) measures a complex resistivity spectrum (that can be represented by a real part R and an imaginary part X, or else by an amplitude and a phase) in a given range of frequencies. This technique was in particular used in mine prospecting by Conrad Schlumberger who observed in 1912 a polarization effect on iron ore deposits. Next, its application was extended to water table, freshwater/saltwater interface and clay lens research. It was only around the 1980s that research focused on the sensitivity of the polarization to contaminants.

In particular, various rock polarization effects (redox reactions, ion exchanges and interaction between the organic solvent and the clay) are cataloged by the document (Olhoeft, 1985) from complex electrical resistivity measurements in the laboratory. These measurements were carried out on unconsolidated samples (that is taken from the near surface) and under surface measurement conditions (atmospheric pressure and ambient temperature in particular). It then establishes a range of effective frequencies (that is make it possible to observe the desired effects for the samples considered under the conditions considered) between 1 mHz (which is a submultiple of 1 Hz) and 10 kHz. This range of frequencies is then taken up by various authors to carry out ground measurements, in particular with a view to detecting contaminants. Thus, by following the protocol established in Olhoeft (1985), Daily et al. (2004) showed that zones contaminated by hydrocarbons could be identified by low phase values (less than 350 mrad) and by amplitude and phase anomalies at frequencies between 0.01 and 100 Hz. The studies by Binley et al. (2005) show the contribution of the SIP measurement for estimating transport properties (that is the permeability) and determining the degree of water saturation of aquifers in an unsaturated and saturated zone. These authors in particular established a 2D-3D SIP image of the near surface and transcribed this image into an image of the permeability and water saturation of the medium. In particular, Scott and Barker (2003) have shown that the analysis of SIPs at low frequencies (less than 100 Hz) makes it possible to directly determine the pore throat size in a given reservoir. Thus, these SIP measurements were in the past performed on the ground in the range of low frequencies (at most 10 kHz), only under surface conditions, and targeted measurements on unconsolidated portions of underground formations, that is near-surface portions of underground formations.

It should be noted that there are "resistivity" logging tools (for example patent EP 0384823 A1) that make possible measurement of the resistivity of an underground formation in a region around the well. However, the existing resistivity logging tools measure the resistivity in a single-frequency mode. The emission frequency is for example equal to 500 Hz, or to 1 kHz or to 100 MHz which is $10^6$ depending on the tools used.

Thus, measurements of spontaneous potential and of spectral induced polarization have already been carried out in the past. However, to date, no device or process that integrates these two types of measurements is known, either on a laboratory scale or on a well scale. Furthermore, to date, no process that includes a step of measurements of the complex resistivity in a broad frequency band is known, either during laboratory measurements or during well measurements.

SUMMARY OF THE INVENTION

The present invention relates to the determination of petrophysical parameters relating to the underground formation being studied, at a given stage of the exploitation thereof or throughout the exploitation thereof, from electrical measurements, preferentially carried out on various scales (in the laboratory scale and on the scale of the well).

One of the subjects of the present invention is a device that integrates both a means for measuring the spontaneous potential and a means for measuring the complex electrical resistivity in a broad frequency band (for example between 10 mHz and 30 MHz). Such an integrated device makes possible guaranteeing that the two types of measurement are performed strictly under the same conditions, which increases the reliability of the measurement. This device may be available both on the laboratory scale and on the well scale (in this case it is a logging tool). Furthermore, the measurements performed using the device according to the invention may be at least one of automated, collected and analyzed without human intervention.

One of the subjects of the invention is a process using both the laboratory device and the well device thus described. In particular, this process may, by a calibration between the well measurements and the laboratory measurements, make possible quantifying petrophysical parameters relating to the formation being studied, such as the relative permeability and the water saturation. These petrophysical parameters are then useful for determining a plan for optimal exploitation of the formation.

Generally, the subject of the invention relates to a device for determining petrophysical parameters of a portion of an underground formation comprising a fluid. The device comprises:
  at least two electrodes;
  a means for emitting a variable-frequency electric current and a means for measuring electrical resistivity in terms of amplitude and phase, two of the electrodes cooperating with the means for emitting and at least two of the electrodes cooperating with the means for measuring;
  means for measuring electric potential difference cooperating with at least two of the electrodes; and means for automating the measurements performed by at least one of the means for measuring, a means for collecting the measurements and a means for analyzing the measurements.

According to one embodiment of the invention, the frequencies may be within a range of frequencies having a lower limit between 1 and 20 mHz, and an upper limit between 28 and 32 MHz.

Advantageously, the electrodes may be made of nonpolarizable metal material.

Preferentially, the number of electrodes may be between 4 and 8 and preferably 6.

According to one embodiment of the invention, a number of the electrodes may be distributed over a length of a support formed of an insulating material.

According to one embodiment of the invention, the device may be intended for laboratory measurements with the portion of the formation being a sample of the formation which is for example removed by core drilling, and:
- the support may be a flexible sleeve of substantially cylindrical shape intended to receive the sample;
- the electrodes may be at least four in number and two of the electrodes are placed to be in contact with each free cross section of the sample; and
- the length of the support may be oriented along an axis of revolution of the support.

According to one embodiment of the invention that may be intended for laboratory measurements, the sleeve may be a heat-shrinkable sheath and at least two of the electrodes may be pierced through the sheath, to pass through the sheath.

According to one embodiment of the device of the invention that may be intended for laboratory measurements, the device may further comprise means for injecting a working fluid into the sample and for regulating the flow rate of the working fluid, and a means for measuring the fluid pressure in at least two locations of the sample.

According to one embodiment of the device that may be intended for laboratory measurements, the device may further comprise at least one of a hydraulic containment cell and a temperature-regulating means.

One embodiment of the device which is used for laboratory measurements, may further comprise geochemical measuring means such as means for measuring alkalinity, conductivity, contents of major cations-anions, contents of trace elements, and content of dissolved gas after sampling.

According to one embodiment of the invention, which may be used for measurements within at least one well drilled into the formation such as logging measurements, the portion of the formation being a zone surrounding the well wherein the device being possibly of substantially cylindrical shape is inserted in the well. The electrodes possibly are rings having a diameter slightly greater than the diameter of the support and being distributed along the axis of revolution of the cylinder.

According to one embodiment of the device intended for measurements within at least one well drilled into the formation, the resistivity measuring device, the electrical potential difference measuring device, and the electrical current emitting device may be placed at the surface of the formation and may cooperate with the electrodes via an electrical connection means that are resistant to the pressure and temperature conditions inherent to measurements in wells.

The invention also relates to a process for exploiting an underground formation comprising a fluid, starting from at least one sample of the formation in which the formation is traversed by at least one well, the process comprising at least the following steps:
i. for at least one measurement condition, at least measurements of spontaneous potential and of spectral induced polarization are performed on the sample by use of one of the embodiments of the invention intended for laboratory measurements with petrophysical parameters representative of the sample being determined;
ii. measurements of spontaneous potential and of spectral induced polarization are performed in the well by use of at least one device according to one of the embodiments of the invention intended for measurements within a well;
iii. the measurements performed in the well are calibrated from the measurements performed on the sample and petrophysical parameters representative of the formation are determined; and
iv. using the petrophysical parameters representative of the formation to define a plan for optimal exploitation of the formation and exploiting the formation using the plan.

According to one embodiment of the process according to the invention, during step i):
a) a pressure gradient induced in the sample may be measured by use of the means for performing fluid pressure measuring;
b) an electrical potential difference induced in the sample is measured by use of the means for measuring electrical potential difference; and
c) measuring a spectral induced polarization within the sample measured by use of means for measuring the spectral induced polarization;

and the measurements a), b) and c) are repeated for different fluid flow rates and for different fluid saturations.

According to one embodiment of the process according to the invention, the measurements a), b) and c) may be repeated for at least one of different containment pressures and different temperatures.

According to one embodiment of the process according to the invention, the petrophysical parameters representative of at least one of the formation and of the sample may be at least one of the relative permeability and the saturation.

According to one embodiment of the process according to the invention, step ii) may be repeated throughout the exploitation of the formation.

Other features and advantages of the process according to the invention will become apparent on reading the description below of nonlimiting examples of embodiments, with reference to the appended Figs. that are described below.

DETAILED DESCRIPTION OF THE INVENTION

One of the subjects of the invention relates to a device for an integrated measurement of complex electrical resistivity and spontaneous potential, for determining petrophysical parameters relating to a portion of an underground formation comprising a fluid. These petrophysical parameters are in particular useful for determining a plan for optimal exploitation of the underground formation being studied.

A portion of the underground formation being studied may be for example:
- a sample of the formation, removed by core drilling: in this case, the device according to the invention is intended for so-called "laboratory" measurements and is referred to as "laboratory device according to the invention" hereinafter;
- a zone surrounding a well drilled into the formation being studied and into which the device is inserted and in this case, the device according to the invention is intended for so-called "logging" measurements and is referred to as "well device according to the invention" hereinafter.

The device according to the invention comprises:
- at least two electrodes;
- means for emitting a variable-frequency electrical current, connected to at least two electrodes;
- means for measuring the electrical resistivity in terms of amplitude and phase (or complex electrical resistivity measurement), connected to at least two other electrodes;
- means for measuring an electric potential difference, connected to at least two electrodes.

Thus, the device according to the invention makes possible performing, in an integrated manner and in a single experiment, at least two types of measurements which are a spontaneous potential measurement (by means of at least two of the electrodes and means for measuring an electrical potential difference) and a spectral induced polarization measurement (by means of at least two of the electrodes, of the means for emitting a variable-frequency electrical current, and of the means for measuring the electrical resistivity in terms of amplitude and phase).

Consequently, the device according to the invention makes it possible to guarantee that two types of measurements, namely Spontaneous Potential measurements and Spectral Induced Polarization measurements, are performed under the same experimental conditions (identical portion of the formation that is not degraded by successive measurements, strictly identical positions of the electrodes for the two types of measurement, strictly identical pressure and temperature conditions, etc), which increases the reliability of the measurement.

Furthermore, having one and the same device for integrated measurements makes it possible, for a producer, to reduce the overall operating costs of the device (reduced purchase and maintenance costs with a single device, reduction in the number of handling operations by the technician in charge of the experiments).

Moreover, the combination of the Spontaneous Potential measurements and of the Spectral Induced Polarization measurements makes it possible to attain petrophysical parameters essential for the characterization of the portion of the formation being studied, and thereby for the definition of a plan for the optimal exploitation of the formation being studied. This point will be expanded upon more fully hereinbelow in the description of the process according to the invention.

According to one implementation of the invention, the means for measuring the electrical resistivity in terms of amplitude and phase comprises means for measuring the electrical potential difference and means for processing the electrical potential difference measurement. The means for processing the electrical potential difference measurement makes possible determination of the amplitude and the phase of the electrical potential difference measurement performed for an electrical current emitted at a given frequency with the means for emitting a variable-frequency electrical current.

Furthermore, the device according to the invention comprises means for automated measurements performed by the device according to the invention, and at least one of means for collecting and means for analyzing the measurements. In this way, by the automating means, the measurements to be performed by the device according to the invention may be preprogrammed and do not require human intervention in order to manually modify at least one of the measurement parameters (intensity of the current injected, frequencies sampled, etc.) and the measurement conditions (surrounding pressure, temperature, fluid saturation, etc.). The means for collecting the measurements further makes it possible to gather, centralize and store all of the measurements performed by the device according to the invention, automatically by the automating means, or with human intervention. Finally, the means for analyzing the measurements, performed in an automated manner or manually by a technician, collected by a collection means or manually by a technician, may be analyzed automatically and systematically by an analysis means. The analysis means may comprise a computer on which software is implemented that makes possible to perform analysis of the measurements resulting from the device according to the invention. For example, this software may make it possible to plot curves, representing the values measured as a function of at least one of measurement parameters and measurement conditions, which parameters and conditions have for example been preprogrammed in advance.

Figure 1:
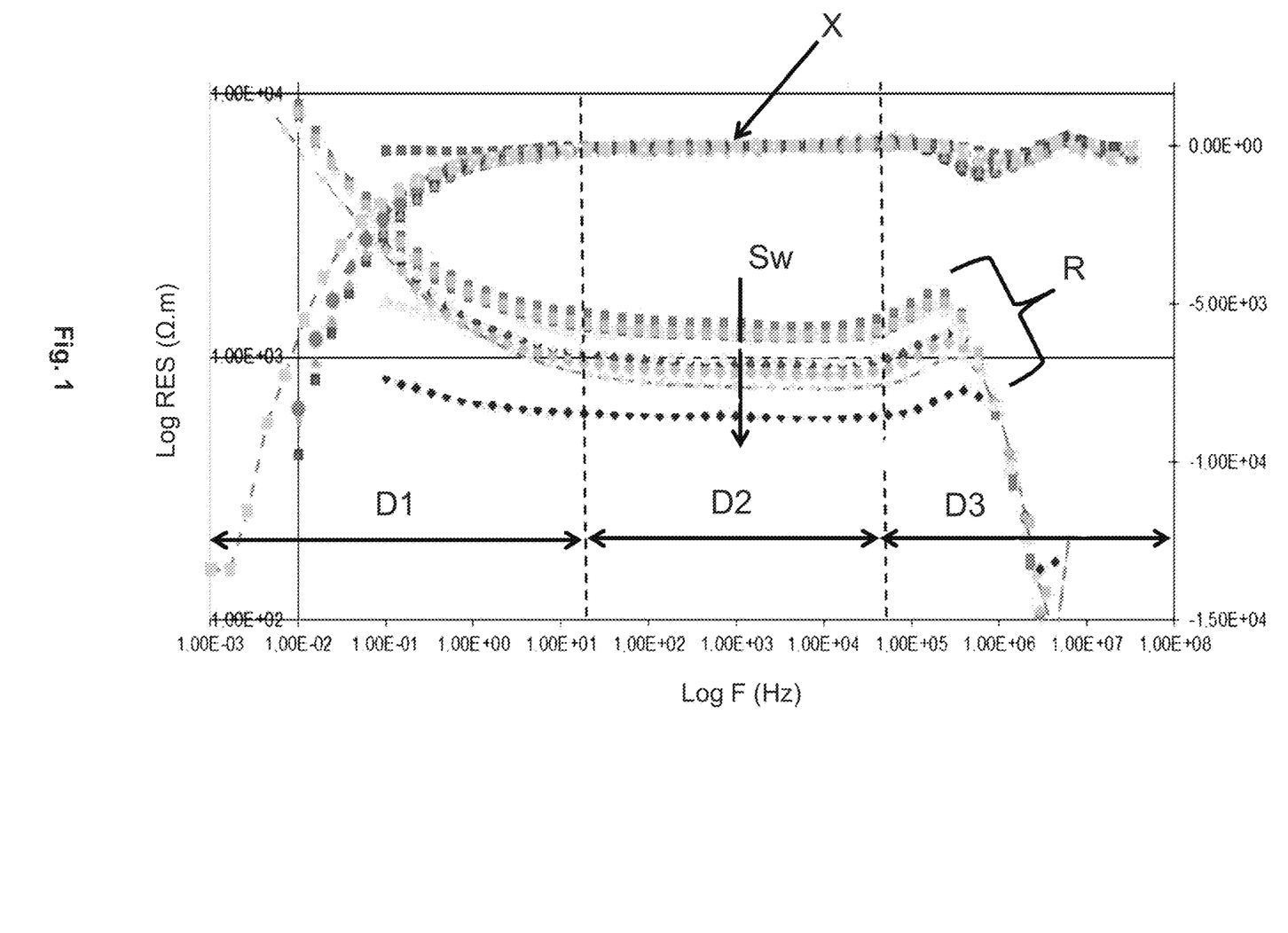
FIG. 1 corresponds to an example of Spectral Induced Polarization measurements performed by use of an embodiment of the device according to the invention, in the case of a sample of Brauvilliers limestone and for different brine saturations Sw of this sample.

According to one embodiment of the invention, the frequencies emitted by the means for emitting a variable-frequency electrical current are between 1 µHz and 1 GHz. In this way, and with the aid of the means for measuring the electrical resistivity in terms of amplitude and phase according to the invention, an estimation of the spectral induced polarization (denoted SIP hereinafter) in a wide range of frequencies is attained. FIG. 1 presents an example of a result of Spectral Induced Polarization measurements, in particular their real part R and their imaginary part X, for frequencies between 1 µHz and 1 GHz, the measurements having been carried out on a given rock sample (Brauvilliers limestone of "oolitic grainstone" type), for various brine saturations Sw (between 27% and 100%, the values increasing along the direction indicated by the arrow with a value of Sw=100% corresponding to total brine saturation) and various types of brine (brine containing 10 g of NaCl and brine containing 5 g of NaCl in this case). In particular it is possible in this Fig. to distinguish three domains in which the SIP measurements have substantially different behaviors: the low-frequency domain (domain D1), the medium-frequency domain (domain D2), and the high-frequency domain (domain D3). Thus, in:

the low-frequency domain (domain D1), that is for frequencies below for example 20 Hz (it should be noted that this frequency may depend on the materials), the SIP is particularly sensitive, in the case of a brine saturation of 100%, to the size of the polarizable grains, to the specific surface area, to the pore size, to the permeability, and to the cementation exponent m of Archie's law, whereas in the case of a two-phase medium (comprising water or brine, and another non-conductive fluid such as gas and/or oil, to the percentage brine saturation $S_w$. It can be demonstrated that the SIP can be characterized in the low-frequency field by two parameters which are relaxation time (also referred to as low-frequency critical frequency) and phase angle;

the medium-frequency domain (domain D2), that is for frequencies between for example of 20 Hz and 30 kHz where the variations of the SIP are in the form of a plateau and the SIP is sensitive in particular to the saturation of the medium, to the permeability, and to the specific surface area;

the high-frequency domain (domain D3), that is for frequencies above for example 0.03 MHz where the variations of the SIP are again very sensitive to the frequency, which makes it possible to obtain information in particular on the relative dielectric permittivity, the saturation of the porous medium, the porosity and the cation exchange capacity.

Preferentially, the device according to the invention makes possible emission of an electrical signal in a range of frequencies having a lower limit between 1 and 20 mHz (and preferentially equal to 10 mHz), and an upper limit between 28 and 32 MHz (and preferentially equal to 30 MHz), which makes it possible to limit the times devoted to the measurement, while making it possible to attain the aforementioned quantities. Indeed, as shown in FIG. 1, these limit values of the preferential frequency range are sufficient in order to "capture" the main trends of the variations of the complex electrical resistivity as a function of the emitted frequency, which makes possible deducing therefrom petrophysical parameters (such as saturation, permeability, porosity, etc.) that are characteristic of the portion of formation considered.

According to one embodiment of the invention, the Spectral Induced Polarization measurements are performed for around fifty separate frequency values of regular sampling, on a logarithmic scale in the chosen frequency range.

According to one embodiment of the invention, the electrodes of the device according to the invention have a conductive material (such as metal) that is nonpolarizable (for example composed of silver or silver chloride). This embodiment makes it possible to perform successive electrical measurements, without having to wait for the electrodes to return to a neutral electrical state. A time saving over all of the experiments to be performed, for a series of frequencies within a given range and according to a given sampling interval, is thus obtained.

According to one embodiment of the invention, the device comprises between four and eight electrodes which preferably is six. The electrodes make possible performing at least one of electrical potential difference measurements and electrical resistivity measurements at various locations of the portion of formation being studied and also to better characterize the portion of formation.

Preferentially, the device further comprises a support, formed of an insulating material of at least a number of the electrodes distributed over a length of the support in question. The dimensions and the shape of the support are a function of the dimensions and the shape of the portion of the formation being considered, so that the number of the electrodes of the device distributed over a length of the support are in contact with the portion of the formation being studied.

According to one embodiment of the invention, in which the portion of the formation being studied is a sample of the formation, removed by core drilling for example, the support may be a flexible sleeve, along which a number of the electrodes are distributed. The dimensions of the support enable the electrodes in question to be in contact with the sample being studied when the latter is inserted in the sleeve. Since a sample removed from an underground formation generally is of substantially cylindrical shape, the sleeve is preferably also of substantially cylindrical shape and the circumference thereof may be slightly greater than that of the sample, so that the sample can be inserted into the sleeve at the same time as being held.

According to one embodiment of the invention in which the portion of the formation is a zone surrounding a well drilled in the formation being studied, the support is of substantially cylindrical shape (a well having a very generally cylindrical shape). The electrodes are distributed along the axis of revolution of the support, and the circumference of the support is related to the circumference of the well so that the support can be inserted into the well and the electrodes are in contact with the portion of the formation being studied. Advantageously, the electrodes are rings with a diameter slightly greater than the diameter of the support and are fastened to the support. Current receiving and emission is then possible radially in the formation studied.

First Embodiment: Device for Laboratory Measurements

According to one embodiment of the invention in which the device according to the invention is intended for laboratory measurements on a sample of the formation being studied (referred to as the first embodiment of the invention hereinafter or else device for laboratory measurements according to the invention), two electrodes are evenly positioned along the axis of revolution of the sleeve and two other electrodes are free and can be placed to establish an electrical contact on each of the free cross sections of the sample of formation inserted in the sleeve. The electrodes placed on the free cross sections are connected to the means for emitting the variable-frequency electrical current, and the at least two other electrodes distributed on the sleeve are connected to the means for measuring the electrical resistivity in terms of amplitude and phase. Advantageously, the set of the electrodes is also connected to the means for measuring the electrical potential difference, for example via a multiplexer.

In a variant of this first main embodiment of the invention, the sleeve in question may comprise a heat-shrinkable sheath. This type of sheath withstands in particular high temperatures and high pressures while preserving the leak-tightness of the sheath. This type of sheath is furthermore inert from the physicochemical point of view. Advantageously, two electrodes pierce the sheath (so as to pass through this sheath) and thus enable contact with the sample inserted into the sheath. These electrodes are electrically connected to the means for measuring the complex electrical resistivity, and preferentially also to the means for measuring the electrical potential. At least two other electrodes are in direct contact with the sample and are electrically connected to the means for emitting a variable-frequency electrical current, and preferably also to the means for measuring the electrical potential.

In another variant of this first main embodiment of the invention, the device further comprises means for injecting a working fluid into the sample and for regulating the flow rate of the working fluid.

The means for injecting a working fluid into the sample and for regulating the flow rate of the working fluid may make it possible to perform complex electrical resistivity measurements and spontaneous potential measurements for various types of fluid (water, oil, gas in particular) and for various respective saturation values of these fluids. This makes possible evaluation of petrophysical parameters relating to a sample of an underground formation for various fluid saturation conditions (various fluids and for various saturations). These various measurements may in particular make it possible to plot nomograms for providing information of the petrophysical parameters expected in the formation being considered, as a function of the various possible saturation conditions.

Means for measuring the fluid pressure in at least two locations of the sample will advantageously be combined with means for injecting a working fluid into the sample and for regulating the flow rate of the working fluid. This measurement configuration makes it possible in particular to perform measurements of the electrokinetic coupling coefficient in a saturated medium.

Advantageously, the first main embodiment of the invention may further comprise a hydraulic containment cell, intended to receive a sample. The containment cell may make it possible to subject the sample of the formation considered to high pressures (for example of the order of 5 MPa). This makes it possible to simulate, within the context of a laboratory measurement, the existing pressure conditions in the underground formation, which may be of the order of 8 to 40 MPa. The spontaneous potential and electrical resistivity measurements performed under conditions that approach the conditions in situ (i.e. under the pressure conditions of the fluid reservoir studied), the petrophysical parameters that can be deduced from these measurements are representative of the actual petrophysical parameters, in situ, unlike measurements which are carried out under surface conditions (pressure of around 1 MPa).

Advantageously, the first main embodiment of the invention may further comprise a means for regulating the temperature, within the containment cell, to simulate the temperature conditions within the formation being studied (and which may reach 60° C. to 150° C.).

Moreover, the first main embodiment of the invention may comprise geochemical measuring means such as means for measuring the alkalinity, conductivity, contents of major cations-anions, contents of trace elements and also the content of dissolved gas after sampling. In the field of petroleum geochemistry, means for carrying out such measurements are known. These measurements make possible obtaining information regarding the precise characteristics of the fluids and gases involved, which may help to refine the optimal exploitation plan targeted by the present invention.

Figure 2:
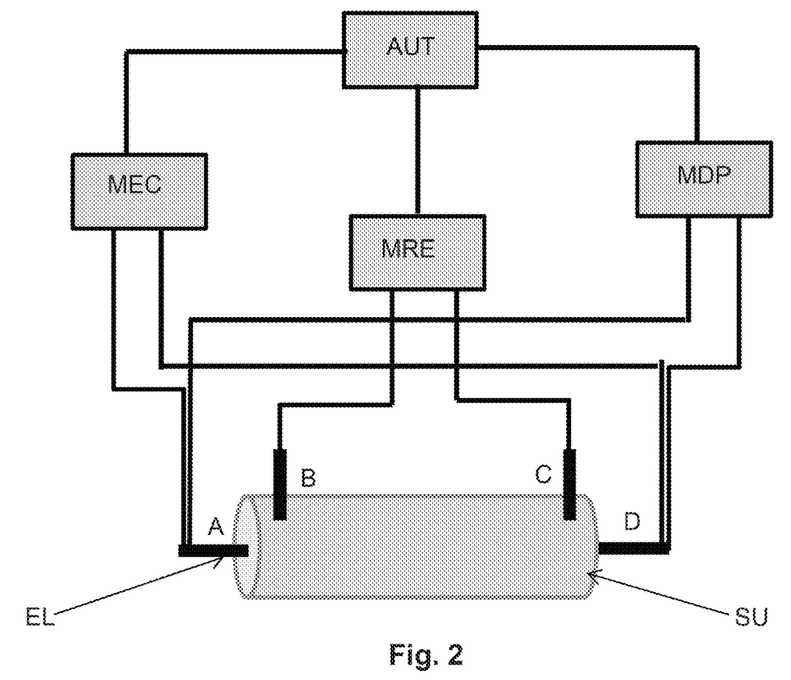
FIG. 2 is an embodiment of a device according to the invention for use in making laboratory measurements.

FIG. 2 presents a variant of the first main embodiment of the device according to the invention. The various elements of the device in question possibly are arranged differently. Thus, this Fig. describes a device comprising a support SU of cylindrical shape, 4 electrodes EL including two electrodes distributed along the support SU and two other free electrodes EL, intended to be placed on each of the free cross sections of the sample of formation inserted in the support SU. The electrodes EL to be placed on the free cross sections are connected to the variable-frequency electrical current emitting means MEC, and the two other electrodes EL distributed on the sleeve SU are connected to means MRE for measuring the electrical resistivity in terms of amplitude and phase. According to this nonlimiting exemplary embodiment of the invention, only two of the four electrodes A and D are connected to the electrical potential difference measuring means MDP, enabling measurements of spontaneous potential difference only between the electrodes A and D. However connections can be made between each of the electrodes A, B, C, D and the electric potential difference measuring means MDP in order to enable for example a measurement of potential difference between the electrodes A and B, A and C and A and D. Furthermore, in this exemplary embodiment, the variable-frequency electrical current emitting means MEC, the means MRE for measuring the electrical resistivity in terms of amplitude and phase, and the electrical potential difference measuring means MDP are connected to an automaton control AUT enabling the measurements to be performed by the device according to the invention to be preprogrammed, thus making it possible to avoid any human intervention in order to manually modify the measurement parameters (intensity of the current injected, frequencies sampled, etc.).

Second Main Embodiment: Device for Logging Measurements

According to one embodiment of the invention in which the device according to the invention is intended for measurements within at least one well drilled in the formation being studied such as logging measurements (referred to as the second main embodiment of the device according to the invention, or else a device for well measurements hereinafter), the complex resistivity measuring means, the electrical potential difference measuring means, and the electrical current emitting means are intended to be placed at the surface of the formation and are connected to the electrodes by connection means that are resistant to the pressure and temperature conditions inherent to measurements in wells.

This main embodiment of the device according to the invention makes it possible to perform, with a single logging tool, two types of measurement (electrical in this case), which is very advantageous from an operational point of view since the implementation of logging measurements is well known for being highly technical and expensive. Furthermore, it is ensured in this way that the two measurements are perfectly performed at the same depth in the well and are representative of the same portion.

According to one embodiment of this second main embodiment of the invention, the electrodes are placed in direct contact with the wall of the well and therefore with the geological formation. According to one embodiment of this second main embodiment of the invention, the dimensions of the device for well measurements are of the order of 2500 mm long and 45 mm in diameter. Advantageously, the electrodes are uniformly distributed over a length of the support of 2100 mm with the distance between two consecutive electrodes being 30 mm.

Figure 3:
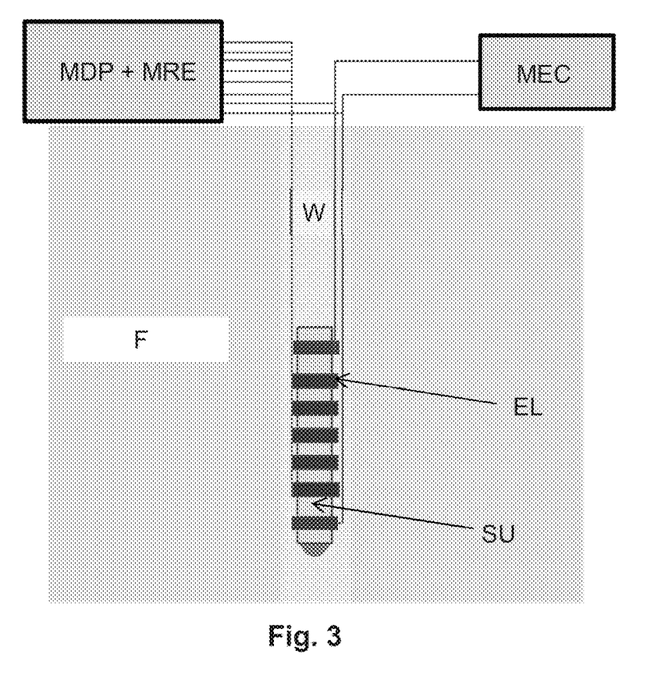
FIG. 3 is an embodiment of a device according to the invention for use in making well measurements.

FIG. 3 presents a variant of the second main embodiment of the device according to the invention, for well measurements with the elements of the device in question possibly being arranged differently. In the example presented, the support SU is a cylindrical tube placed in a well W drilled in a formation F, along which 7 annular electrodes EL are distributed. Each electrode is connected to the spontaneous potential measuring means MDP and to the complex electrical resistivity measuring means MRE. The electrodes located at the two ends of the support are furthermore connected to the variable-frequency electrical current emitting means MEC. Furthermore, the complex electrical resistivity measuring means MRE, the spontaneous potential measuring means MDP and the variable-frequency electric current emitting means MEC are placed at the surface.

Process for Exploiting an Underground Formation

Moreover, the invention relates to a process for exploiting an underground formation comprising a fluid. This process requires at least one sample removed from the formation being studied, the formation being passed through by at least one well, and comprises at least the following steps:

Step 1: for at least one measurement condition, measurements of spontaneous potential and of spectral induced polarization are performed on the sample considered by use of an embodiment of the device for laboratory measurements comprising means for injecting a working fluid into the sample, means for regulating the flow rate of the working fluid, and also means for measuring the fluid pressure in at least two locations of the sample, and petrophysical parameters representative of the sample are determined;

Step 2: measurements of spontaneous potential and of spectral induced polarization are performed in the well considered by use of at least one device according to any one of the variants of the second main embodiment of the device according to the invention (that is the embodiment used for well measurements);

Step 3: the values of the measurements performed in the well are compared with the measurements performed on the sample, and by calibration, petrophysical parameters representative of the formation are determined;

Step 4: using the parameters representative of the formation, a plan for optimal exploitation of the fluid of the formation being studied is defined and the fluid of the formation is exploited using the plan.

Thus, the process according to the invention comprises the implementation of measurements of different types (SP and SIP at least) and on different scales (well scale and laboratory scale). The various steps of the process according to the invention will be described in detail below.

Step 1

During this step, the process according to the invention is carried out by use of a variant of the first main embodiment of the device according to the invention, comprising means for injecting a working fluid into the sample and for regulating the flow rate of the working fluid, and also means for measuring the fluid pressure in at least two locations of the sample.

The measurements carried out with the use of this device (referred to as "laboratory measurements" hereinafter) are performed for at least one measurement condition. The expression "measurement condition" is understood to mean the set of the parameters according to which the measurement is carried out, such as for example the pressure, the temperature, the fluid(s) present in the sample, or the saturation of each the fluid present in the sample. Very preferentially, the laboratory measurements are carried out under measurement conditions representative of the conditions (of pressure, of temperature, of saturations of the fluids involved) to which the formation studied is subjected, that will be referred to as "in situ conditions" hereinafter. It should be noted that the in situ conditions are not generally precisely known but the user deal with orders of magnitude or ranges of the in situ conditions (ranges relating at least one of pressures, temperatures and saturations of the fluids involved). The laboratory measurements are advantageously performed for a plurality of measurement conditions, in particular sampling the ranges of the presumed values of the in situ conditions.

From the laboratory measurements, petrophysical parameters relating to the sample being considered are determined for the measurement condition(s) being considered (at least one of pressure, temperature and fluid saturation conditions). The user has substantial knowledge of methods for determining petrophysical parameters from SIP and SP measurements. According to one embodiment of the invention, the petrophysical parameters representative of the sample are at least one of the relative permeability and the fluid saturation. When measurements were performed for a plurality of measurement conditions, the user may draw up a nomogram representing the values of the measurements performed, the petrophysical parameters deduced from these measurements, and for each measurement condition.

According to one embodiment of the process according to the invention, for at least one predefined containment pressure, one temperature, one predefined fluid saturation, one predefined fluid flow rate, and one injection of given working fluid into the sample:

a. the pressure gradient induced in the sample is measured by use of the fluid pressure measuring means;

b. the electrical potential difference induced in the sample is measured by use of the electric potential difference measuring means;

c. the spectral induced polarization within the sample is measured by use of the spectral induced polarization measuring means;

and the measurements a), b) and c) are repeated for at least one of fluid flow rates, fluid saturations, and working fluids. Nonlimiting methods for exploiting the measurements thus performed in order to determine the relative permeability and the fluid saturation are given below.

Determination of Petrophysical Parameters

The spontaneous potential measurements make possible measurement of an electrical potential difference (that will be denoted dV hereinafter). Combined with the pressure gradient measurements (that will be denoted dP hereinafter), an electrokinetic coupling coefficient C is obtained according to a formula of the type:

$$C = dV/dP,$$

According to the embodiment described above, since the measurements are carried out for various fluid saturation conditions, it is possible to define an electrokinetic coupling coefficient in a saturated medium Csat and an electrokinetic coupling coefficient in an unsaturated medium $C(Sw \leq 1)$. A relative electrokinetic coupling coefficient Cr is then defined, corresponding to the ratio between the electrokinetic coefficient in a saturated medium Csat and the electrokinetic coefficient in an unsaturated medium $C(Sw \leq 1)$. It is also possible to estimate an electroosmosis coefficient Celectro which quantifies the variation in fluid pressure induced by an electric potential difference.

Furthermore, the SIP measurements performed according to the embodiment described above make possible measurement of the complex resistivity, in a saturated medium and in an unsaturated medium. From these measurements, it is possible to deduce for example the following parameters:
- a phase angle $\Theta$, from a formula of the type: $\tan \Theta = X/R$, where R is the real part of the resistivity and X is the imaginary part;
- a relaxation time $\square$, a critical frequency Fc;
- a resistivity index $$I_R = \frac{R_t}{R_o},$$

where $R_t$ and $R_0$ are respectively the real part of the resistivity in an unsaturated medium and in a saturated medium;
a formation factor $$F = \frac{R_0}{R_w},$$

where $R_0$ is the resistivity of the medium 100% saturated with brine, $R_w$ is the resistivity of the brine R.

From the phase angle $\Theta$, the formation factor F, the relaxation time $\square\square\square$ and the critical frequency Fc, a user can deduce therefrom the fluid saturation Sw. A user is in particular familiar with the formula:

$$\tau = \left(\frac{4KF}{D_{(+)}^s}\right) \cdot S_w^2$$

which makes it possible to deduce the saturation $S_w$ from the formation factor F, the permeability K (which may be known moreover, from petrophysical laboratory measurements, such measurements being well known), $D_{(+)}^S$ is the diffusion coefficient (which may be known moreover, from petrophysical laboratory measurements, such measurements being well known to a user or else determined by a formula).

Then, from the fluid saturation Sw and knowing moreover that the resistivity index can also be written $I_R = S_w^{-n}$, n is deduced therefrom, which is the saturation exponent of Archie's law. The relative permeability can then be obtained according to a formula of the type:

$$K_r = C_r \cdot S_w^{n+1}$$

Advantageously, the measurements described above can in addition be repeated for at least one of various containment pressures and temperatures. In order to do this, the device according to the first main embodiment of the device according to the invention may comprise at least one of a hydraulic containment cell and a temperature-regulating means. Thus, the invention makes it possible to perform laboratory measurements for various measurement conditions (of pressure, of temperature, of fluid, of respective saturation of the fluids). In this way, a user can for example establish a nomogram of the petrophysical parameters determined as a function of these measurement conditions.

Step 2

According to the process according to the invention, measurements of spontaneous potential and of spectral induced polarization are additionally performed in the well being considered by use of the device according to any one of the variants of the second main embodiment of the device according to the invention. These measurements will be referred to as "well measurements" hereinafter.

By comparing the values of the measurements performed in the well with those performed in the laboratory, the petrophysical parameters of the formation being studied are determined as a function of the petrophysical parameters obtained by the laboratory measurements. This determination may assume various forms: a direct attribution of the parameters obtained by laboratory measurements (in particular if there is perfect correspondence between laboratory measurements and logging measurements), or else by interpolation of several parameters, by extrapolation, or else by application of any ad hoc function. According to one embodiment of the invention, a scaling function of the measurements performed in the laboratory relative to the measurements performed in the well is applied, to account for different scale factors between these two types of measurement.

According to one embodiment of the invention, a scaling of the measurements performed in the laboratory relative to the measurements performed in the well is applied first, in order to take into account the different measurement conditions.

Figure 4:
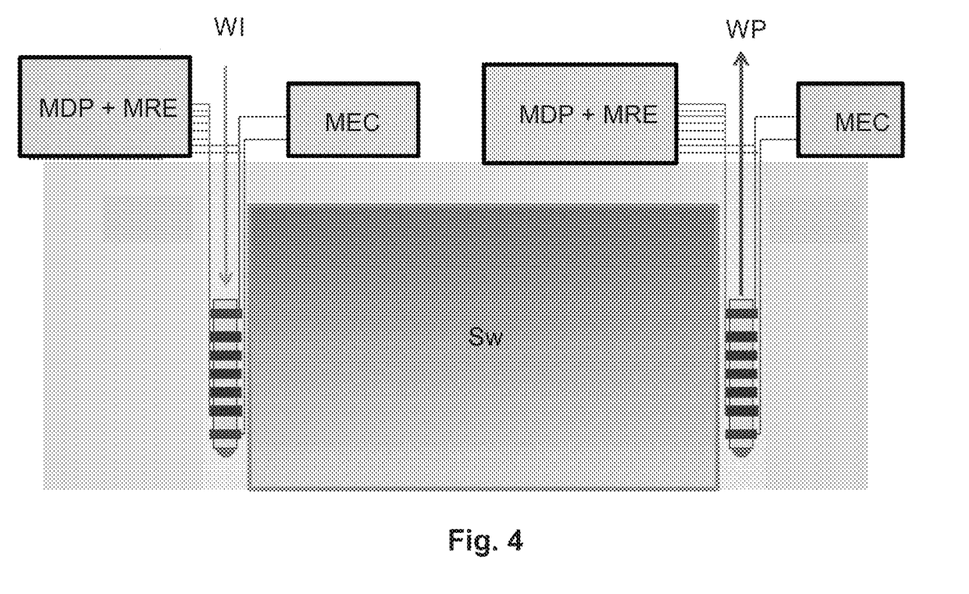
FIG. 4 is an example of a configuration of the invention for use in the permanent monitoring of a site for exploiting a fluid contained within a formation, comprising two devices according to the invention used for well measurements.

An example of an embodiment variant of the process according to the invention is presented in FIG. 4. Thus, this variant comprises two well measurement devices, with one placed in an injection well WI and one placed in a producing well WP for producing the fluid contained in the formation being studied, with the two wells being spaced around a hundred meters apart. For example, when the fluid injected is CO2, such a configuration may make it possible to investigate the variations in petrophysical parameters between the two wells and to monitor the CO2 front (via the saturation) between the wells.

Step 3

From the petrophysical parameters thus determined for the formation being studied, it is possible to define a plan for optimal exploitation of the fluid contained in the formation being studied, that is an exploitation plan that enables optimal exploitation of a fluid being considered according to technical-economic criteria predefined by the user. It may be a scenario that offers a high degree of recovery of the fluid, over a long exploitation time, and that requires a limited number of wells. According to one embodiment of the invention, the optimal exploitation plan may be defined by determining a fluid recovery process (primary, secondary or tertiary recovery process), and also a number, positioning and geometry of at least one of injection and producing wells that make possible satisfaction of predefined technical-economic criteria. Various scenarios may be envisaged and the respective profitability thereof may be approached with the aid of a reservoir simulation. The scenario offering the highest predicted profitability could for example be used.

Step 4

Next, according to the invention, the fluid from the formation being studied is exploited as a function of the exploitation plan determined in step 3, that best satisfies the technical-economic criteria predefined by a user.

The exploitation of the fluid from the formation being studied may then be the creation of boreholes according to the number and the positioning determined in step 3, some of these wells being injection wells and others being producing wells, for injecting into the injection wells possible fluids to improve the recovery of the fluids in place.

According to one embodiment of the invention in which the well measurements described in step 2 are repeated at various moments of the exploitation of the fluid from the formation being studied, the laboratory measurements having been performed first for various measurement conditions, the petrophysical parameters such as the relative permeability and the fluid saturation will be able to be monitored in real time, throughout the production of the fluid. The exploitation plan determined in step 3 could then be revised throughout the exploitation of the fluid from the formation, and the recovery of fluid in step 4 improved.

Exemplary Embodiment

The features and advantages of the process according to the invention will become more clearly apparent on reading the exemplary embodiment below.

The exemplary embodiment in question was carried out with a device according to the first main embodiment of the invention (laboratory device) comprising the following elements:

Containment Equipment

A Coreflood containment cell (Vinci Technologies, France): which is an adjustable piston containment cell, with three inlets on an injection coil, three outlets on an outlet coil, and is transparent to x-rays. Such a cell may makes possible performing measurements up to a hydraulic containment pressure of 50 bar of Marcol. The latter ensures the electrical insulation of the contacts.

A Viton® heat-shrinkable sheath (Hellermann-Tyton, France) equipped with 12 piercings distributed along the generatrix of the sheath and enabling the electrical contacts to be introduced (2 diametrically opposed piercings per electrical measuring point).

Measuring and Regulating (P, T, Flow Rate) Equipment

A 260 D ISCO pump, equipped with an offset pressure sensor which regulates the hydraulic pressure of the containment up to 50 bar as closely as possible to the cell and absorbs the pressure fluctuations linked to the temperature.

An Amersham/Bioscience P920 liquid injection pump providing a flow rate range from 0.00 to 20.00 ml/min, which is used for injecting brine into the porous medium.

A Pharmacia P500 liquid injection pump having a range 1-499 ml/h is used for making up the volume of the system following samplings and the recirculation of the brine on the back face of the porous medium, in order to maintain the capillary contact and the zero capillary pressure at the outlet.

A system of 3 outlet valves permits purging of the dead volumes of the cell of brine and to improve the determination of the pore volume.

Two Keller PAA-33X (0-30 bar) pressure sensors measure the relative pressure upstream and downstream of the assembly. They also enable the control of the injection pressure at the top of the porous medium and the adjustment of the pore pressure. Furthermore, the downstream sensor makes it possible to balance the pressure of the sampling loop with the pore pressure following a sampling, to not destabilize the pore pressure of the system.

A Keller PD39X pressure sensor measures the differential pressure generated by the flow in the porous medium.

A Bronhkorst P702CV gas pressure regulator (Bronhkorst, France) provides control of the pore pressure up to 20 bar, by regulation of the pressure of the gas fraction contained in the separator.

A Bronhkorst F-201-CV gas flow regulator (Bronhkorst, France), calibrated with N2 and CO2, providing a range of flow rates normalized in terms of pressure and temperature (Patm and 0° C.) from 1 to 310 min/min. It is used to inject the gas at the inlet of the porous medium and permits regulation of the flow rate up to a pressure of 20 bar.

A PT100 temperature probe measures the temperature of the brine entering the porous medium. It provides correct viscosity of the brine, the density and the resistances measured by the Arps equation.

A two-phase brine/gas separator placed downstream of the cell, which makes possible reinjection of the collected brine that has already passed through the porous medium. It also makes it possible to measure the volume variations resulting from the porous medium during the experiment Kr.

Electrical Resistivity and Spontaneous Potential Measurement Equipment

A Solartron Si1260 is an impedance/Gain-Phase analyser, enabling measurements of resistance and phase shift (R, X) with a frequency sweep over a range from 1 mHz to 32 MHz, by adjustable intervals. The measurements are performed with the generator set at 1 volt ac. Coupling with the Agilent multiplexor makes possible working with 2 or 4 electrodes.

The Solartron also makes possible injection of a direct voltage of from 0 to ±40 volt in order to calculate the electroosmosis coefficient of the system.

An Agilent 34970A acquisition system equipped with a multiplexing board enables the acquisition of potentials between the selected sections of the porous medium.

A central acquisition unit recovers all of the measurements performed on a PC, via the Labview acquisition system.

4 nonpolarizable electrodes positioned as presented in FIG. 2.

Experimental Protocol

Sample Preparation and Characteristics

The porous medium is derived from a block from a referenced quarry. It is cored with a diameter of 40 mm and sawn with a parallel-sided saw, in water. The samples are dried in an oven at 60° C. The sample is weighed when dry. The geometrical characteristics of the experimental sample are determined using vernier calipers: diameter and length. The sample is photographed and referenced.

Installing the Sample in the Cell

The sample is mounted in the Viton sheath with the electrodes being connected and the contacts being verified using a multimeter. The sample and its sheath are mounted in the cell and placed under hydraulic containment with Marcol, at the chosen containment pressure (30 bar). The containment pressure is at least 15 bar higher relative to the pore pressure chosen for the experiment.

The sample is then placed under rough vacuum. A brine of chosen concentration is produced (here 10 g/l of NaCl), and its conductivity is measured. The sample is saturated with the brine with at the pore pressure chosen for the experiment, with the aid of a pressure-regulating Isco pump.

Measurements Performed

The following measurements are performed:
1—Successive measurements of spontaneous potential at each section of the sample, coupled with the variations of dP (induced by a flow rate variation) until the system is at a pseudo-equilibrium (i.e. until the spontaneous potentials SP stabilize). This measurement makes it possible to determine the electrokinetic coupling coefficient.

2—Spectral induced polarization measurements with a frequency sweep, at 100% brine saturation and under the experimental flow rate, with 4 electrodes (2 injection electrodes and 2 measuring electrodes), at 1 volt, over the range extending from 1 mHz to 30 MHz. This measurement enables the measurement of the resistivity index (IR) when the measurement is repeated at various degrees of saturation.

3—Spectral induced polarization measurements with a frequency sweep, at 100% brine saturation and under the experimental flow rate, with 4 electrodes, at 1 volt, over the range extending from 1 mHz to 30 MHz. The objective of this operation is to obtain a phase angle (phase shift between the "R" values and the "X" values), a relaxation time and also a critical frequency for each section analyzed.

4—Measurements of pressure gradients, at the inlet and outlet of the sample;

5—Measurements of induced potentials, in a range extending from 0 to ±40 volt, are carried out over the whole of the porous medium and give rise to variations of dP. This type of measurement makes it possible to determine the electroosmosis coefficient.

The first 4 steps above were carried out for various fluid saturations (draining/soaking steps).

The set of measurements performed according to the experimental protocol defined below make it possible to plot curves of variations of the measurements performed as a function of the measurement conditions. Examples of such curves, also referred to as nonograms, are presented in FIGS. 5 to 7.

Figure 5:
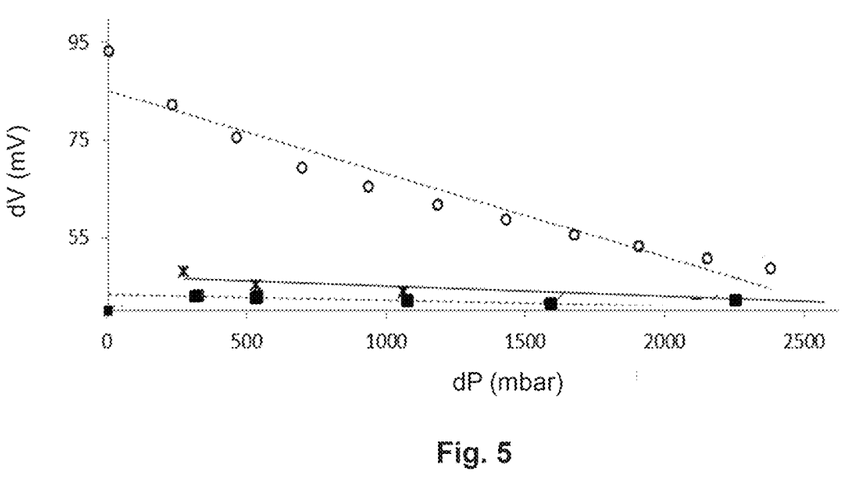
FIG. 5 illustrates the evolution of electrical potential difference dV as a function of the variation in fluid pressure dP for different samples originating from an underground formation.

Thus, FIG. 5 presents the curves of variations of the electrical potential difference dV as a function of the variation of fluid pressure dP for samples of Brauvilliers limestone (white circles), Saint-Emilion limestone (black squares), and dolomites LS2 (crosses). From the slopes of these curves, the electrokinetic coupling coefficient is respectively deduced (in a saturated medium in the present case), for each of the samples being considered.

Figure 6:
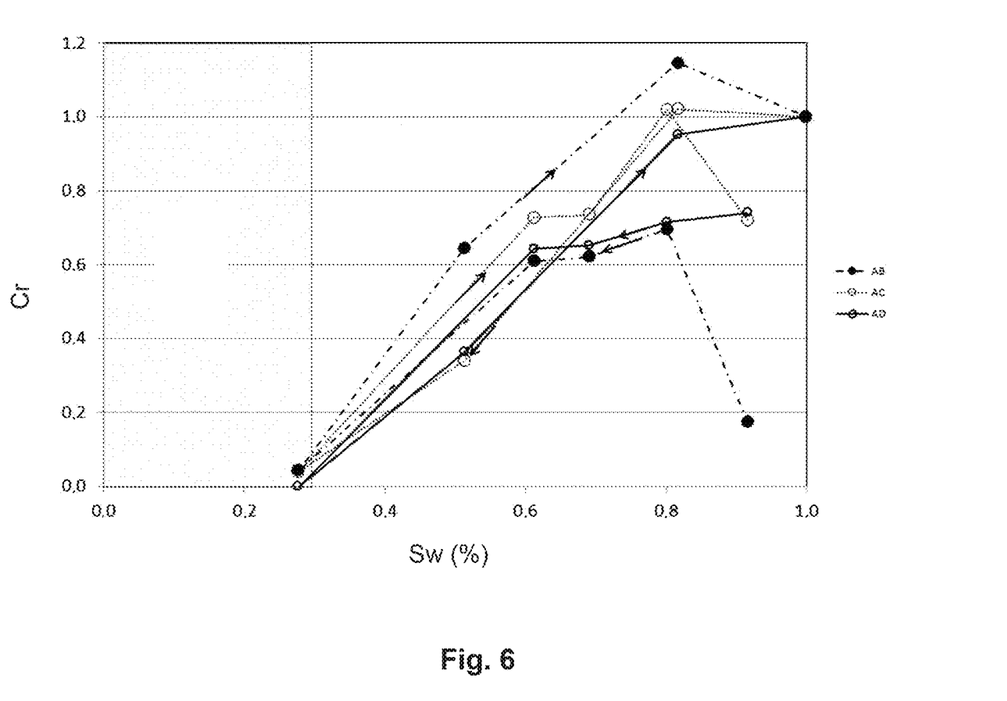
FIG. 6 illustrates the evolution of the relative electrokinetic coupling coefficient Cr as a function of the fluid saturation Sw, for various positions of electrodes illustrated in FIG. 2, in the case of a Brauvilliers limestone.

FIG. 6 presents the evolution of the relative electrokinetic coupling coefficient Cr as a function of the fluid saturation Sw, in the case of the Brauvilliers limestone, and for various positions of the electrodes with the positions of the electrodes ABCD being presented in FIG. 2.

Figure 7:
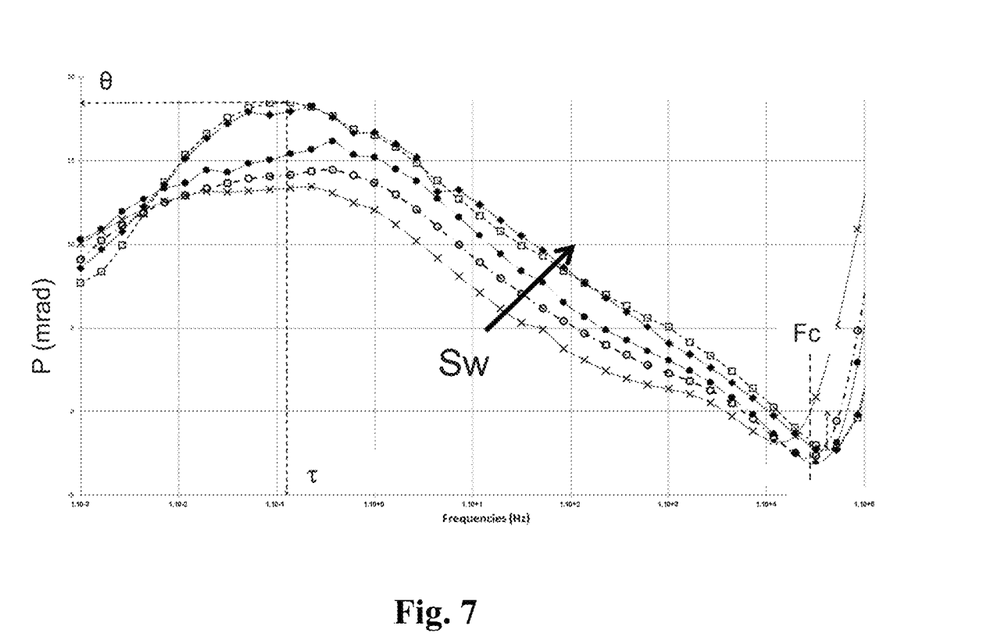
FIG. 7 illustrates the evolution of the phase angle P of the complex electrical resistivity as a function of the frequency F in the case of a Brauvilliers limestone, for various brine saturations Sw.

FIG. 7 presents the evolution of the phase angle P of the complex electrical resistivity as a function of the frequency F in the case of the Brauvilliers limestone, and for various brine saturations $S_w$ (between 27% and 100% with the increase in the saturation values being shown by an arrow in FIG. 7). As indicated in FIG. 7, it is possible to deduce therefrom, for each saturation condition Sw, a value of the phase angle Θ (ordinate of the first peak formed by the curve), a relaxation time τ (abscissa of the first peak formed by the measurement curve) and a critical frequency Fc (abscissa of the first trough formed by the measurement curve).

Thus such curves, obtained in particular by both SP and SIP measurements, for various samples representative of the formation being studied and for various measurement conditions, form nonograms, which enable a user, having in addition at their disposal, according to the process according to the invention, electrical measurements of the same type (i.e. of SP and SIP type) performed in the well, to make connections between the values of the well measurements and the values of the laboratory measurements, and to deduce therefrom the in situ petrophysical parameters, such as the relative permeability and the fluid saturation. These petrophysical parameters are particularly useful to define a plan for the optimal exploitation of the formation being studied.

The invention claimed is:

1. A device for determining petrophysical parameters of at least one core sample from an underground formation comprising a fluid, comprising:
    at least four electrodes distributed over a length of a support comprising an insulating material and configured as a flexible cylindrical sleeve for receiving at least one core sample;
    means for emitting a variable-frequency electrical current and a means for measuring electrical resistivity in terms of amplitude and phase of the variable-frequency electrical current, two of the electrodes cooperating with the means for emitting and two of the electrodes cooperating with the means for measuring electrical resistivity;
    means for measuring an electrical potential difference coupled with two of the electrodes;
    means for automating at least one of measurements performed by the means for measuring an electrical potential difference, means for collecting the measurements and means for analyzing the measurements;
    means for making laboratory measurements;
    two of the electrodes contact open cross sections of the at least one core sample; and
    a length of the support is oriented along an axis of revolution of the support and a process of using the device.

2. The device as claimed in claim 1, wherein the variable-frequency electrical current ranges from a lower limit between 1 and 20 MHz (Megahertz), and an upper limit between 28 and 32 MHz.

3. The device as claimed in claim 1, wherein the electrodes comprise nonpolarizable metal material.

4. The device as claimed in claim 1, comprising at least one of a hydraulic containment and a temperature regulating cell.

5. The device as claimed in claim 1, wherein a number of the electrodes ranges between 4 and 8.

6. The device as claimed in claim 2, wherein a number of the electrodes ranges between 4 and 8.

7. The device as claimed in claim 1, comprising means for measuring at least one of alkalinity, conductivity, and contents of cations-anions, contents of trace elements, and contents of dissolved gas after sampling.

8. The device as claimed in claim 1, wherein the cylindrical flexible sleeve is a heat-shrinkable sheath and at least two of the electrodes pass through the heat-shrinkable sheath.

9. The device as claimed in claim 2, wherein the cylindrical flexible sleeve is a heat-shrinkable sheath and at least two of the electrodes pass through the heat-shrinkable sheath.

10. The device as claimed in claim 3, wherein the cylindrical flexible sleeve is a heat-shrinkable sheath and at least two of the electrodes pass through the heat-shrinkable sheath.

11. The device as claimed in claim 4, wherein the cylindrical flexible sleeve is a heat-shrinkable sheath and at least two of the electrodes pass through the heat-shrinkable sheath.

12. The device as claimed in claim 1, comprising means for injecting a working fluid into the at least one core sample and for regulating a flow rate of the working fluid, and a means for measuring fluid pressure in at least two locations of the at least one core sample.

13. The device as claimed in claim 3, comprising means for injecting a working fluid into the at least one core sample and for regulating a flow rate of the working fluid, and a means for measuring fluid pressure in at least two locations of the core sample.

14. The device as claimed in claim 8, comprising means for injecting a working fluid into the at least one core sample and for regulating a flow rate of the working fluid, and a means for measuring fluid pressure in at least two locations of the core sample.

15. The device as claimed in claim 1, wherein the device provides measurements within at least one well drilled into the formation with a portion of the formation being a zone surrounding the well in which the device is inserted, and the electrodes are rings having a diameter greater than a diameter of the support and are distributed along an axis of revolution of the cylinder.

16. The device as claimed in claim 1, wherein the means for measuring resistivity, the means for measuring electrical potential difference, and the means for emitting an electric current are placed at a surface of the underground formation and cooperate with the electrodes via connections that are resistant to pressure and temperature conditions present during measurements in wells.

17. A process for exploiting an underground formation containing a fluid with a device for determining petrophysical parameters of at least one core sample from the underground formation comprising at least four electrodes distributed over a length of a support configured as a cylindrical flexible sleeve for receiving the at least one core sample comprising an insulating material; means for emitting a variable-frequency electrical current and a means for measuring electrical resistivity in terms of amplitude and phase of the variable-frequency electrical current, two of the electrodes cooperating with the means for emitting and two of the electrodes cooperating with the means for measuring electrical resistivity; means for measuring an electrical potential difference coupled with two of the electrodes; means for automating at least one of the measurements performed by the means for measuring an electrical potential difference, means for collecting the measurements, and means for analyzing the measurements; means for making laboratory measurements; two of the electrodes contact open cross sections of the at least one core sample; and a length of the support is oriented along an axis of revolution of the support, the process comprising the steps of:
  i. performing measurements for at least one measurement condition of at least spontaneous potential, of spectral induced polarization on the at least one core sample and determining petrophysical parameters representative of the at least one core sample;
  ii. performing measurements of spontaneous potential and of spectral induced polarization in at least one well;
  iii. calibrating the measurements performed in the well from measurements performed on the at least one core sample and determining petrophysical parameters representative of the underground formation; and
  iv. using the petrophysical parameters representative of the underground formation to define a plan for optimal exploitation of the underground formation and exploiting the underground formation using the optimal exploitation plan.

18. The process as claimed in claim 17, further comprising during step i):
  a. measuring a pressure gradient induced in the at least one core sample with means for measuring fluid pressure;
  b. measuring the electric potential difference induced in the at least one core sample with means for measuring the electrical potential difference; and
  c. measuring a spectral induced polarization within the at least one core sample with the means for measuring the spectral induced polarization and repeating the measurements a), b) and c) for fluid flow rates and for fluid saturations.

19. The process as claimed in claim 18, wherein the measurements a), b) and c) are repeated for at least one of containment pressures and temperatures.

20. The process as claimed in claim 17, wherein the petrophysical parameters representative of at least one of the underground formation and of the at least one sample are at least one of relative permeability and saturation.

21. The process as claimed in claim 17, wherein step ii) is repeated throughout the exploitation of the underground formation.

* * * * *